United States Patent

[11] 3,563,510

| [72] | Inventor | Werner K. Priese<br>Barrington, Ill. |
|---|---|---|
| [21] | Appl. No. | 848,008 |
| [22] | Filed | Aug. 6, 1969 |
| [45] | Patented | Feb. 16, 1971 |
| [73] | Assignee | Hills-McCanna Company<br>Carpentersville, Ill. |

[54] VALVE SEALED BY CALKING RING ANCHORED IN SUPPORT GROOVE
16 Claims, 13 Drawing Figs.

[52] U.S. Cl. .................................................. 251/173,
251/306, 251/317
[51] Int. Cl. .................................................. F16k 5/14
[50] Field of Search .................................................. 251/172,
173, 317, 306, 316

[56] References Cited
UNITED STATES PATENTS

| 2,081,842 | 5/1937 | Sharp | 251/173 |
| 2,705,016 | 3/1955 | Saar | 251/173X |
| 2,911,184 | 11/1959 | Moore | 251/173 |
| 3,076,631 | 2/1963 | Grove | 251/317X |
| 3,304,050 | 2/1967 | Fawkes | 251/173X |

*Primary Examiner*—Harold W. Weakley
*Attorney*—Burmeister, Palmatier & Hamby

ABSTRACT: A valve that is sealed, when closed, by the calking action against a sealing surface of a dynamic calking ring held by an integral anchoring flange in an annular support groove closely confronting the sealing surface. Relatively thin in relation to the calking ring, the anchoring flange is anchored in an annular position generally perpendicular to a transverse tangent to the sealing surface. The ring support groove is dimensioned laterally in relation to the ring to define on opposite sides of the ring annular plenum spaces opening into the groove to the groove bottom to fully expose the corresponding side surfaces and back of the ring to fluid pressures on the respective sides of the valve. The side surfaces of the groove confront the sealing surface at angles lacking any material degree of obtuseness all to the end that mechanical initial sealing of the valve is intensified by a fluid pressure energized calking action of the ring having a maximized effectiveness with respect to differential pressure in either direction. Comprised of a yieldable, annular pressure sustaining core sheathed in a yieldable polymeric material, the calking ring can be sheathed in and otherwise formed partially or wholly of metal for high temperature and other special applications.

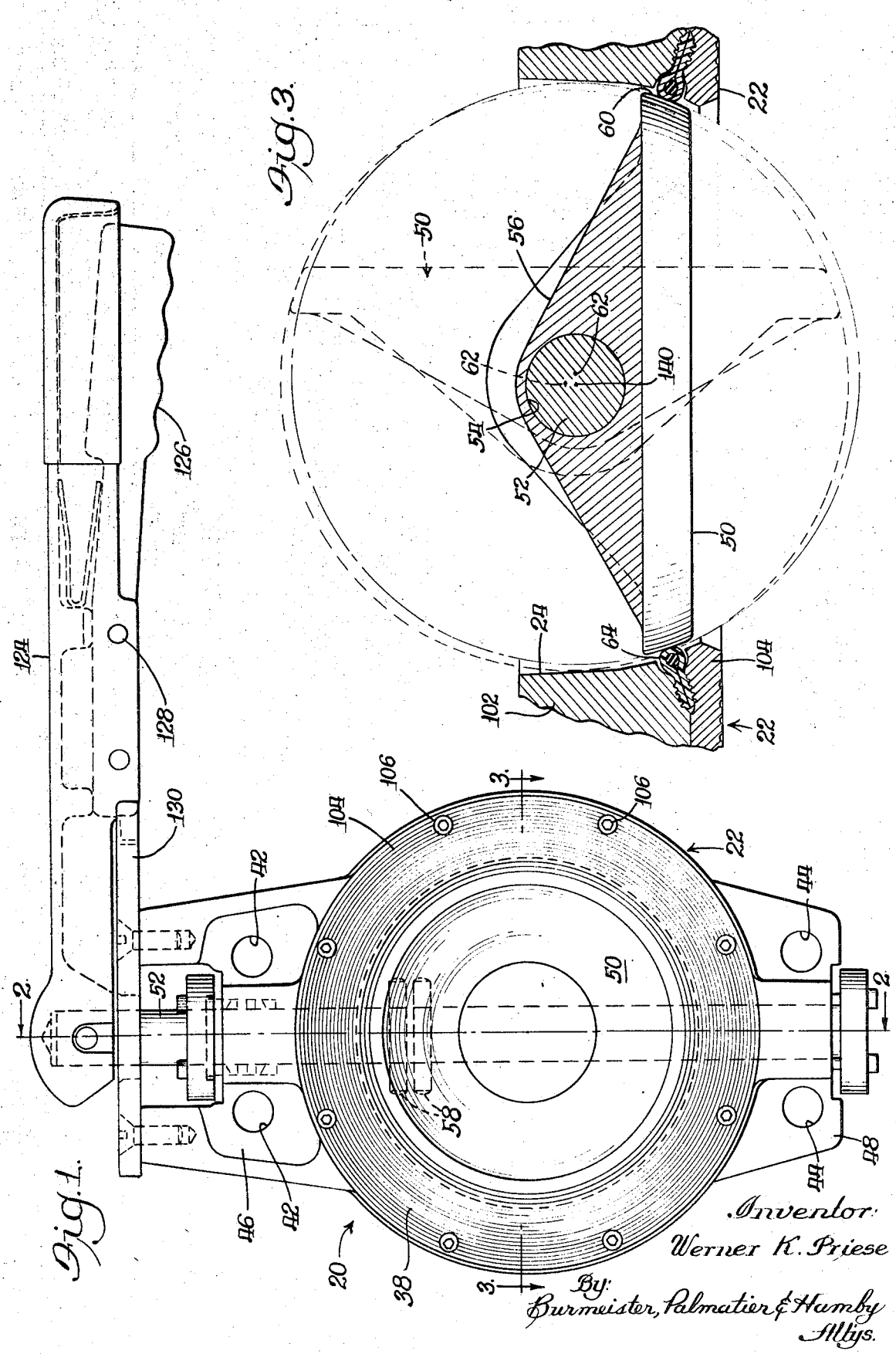

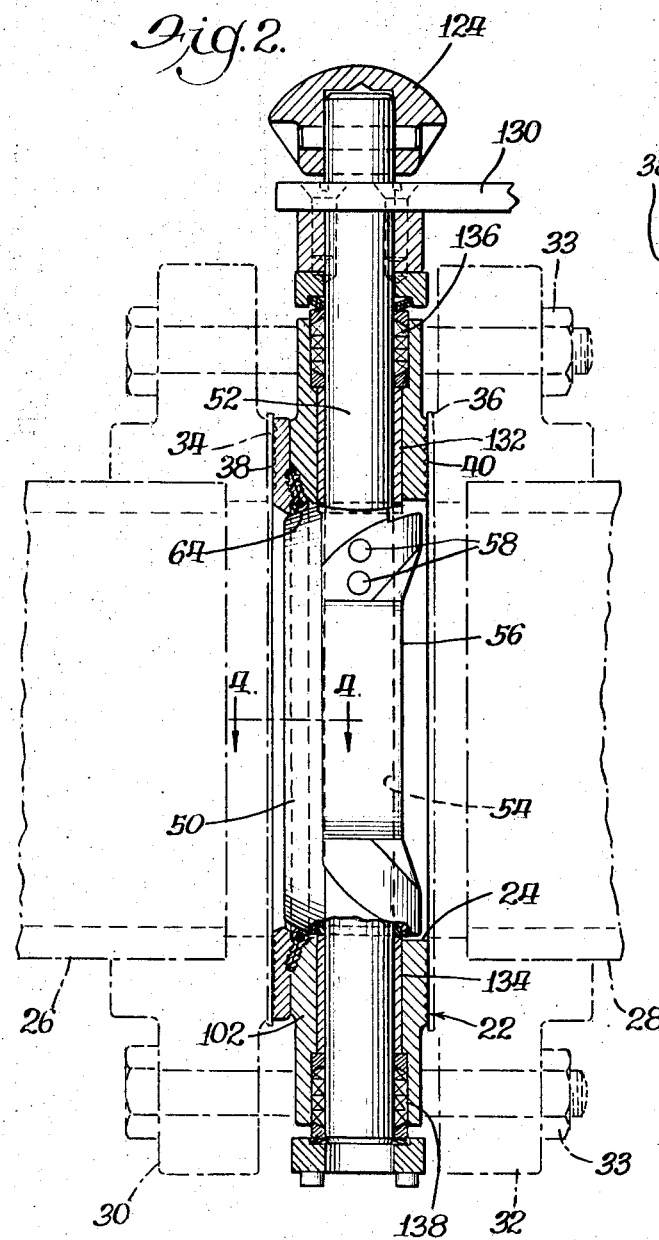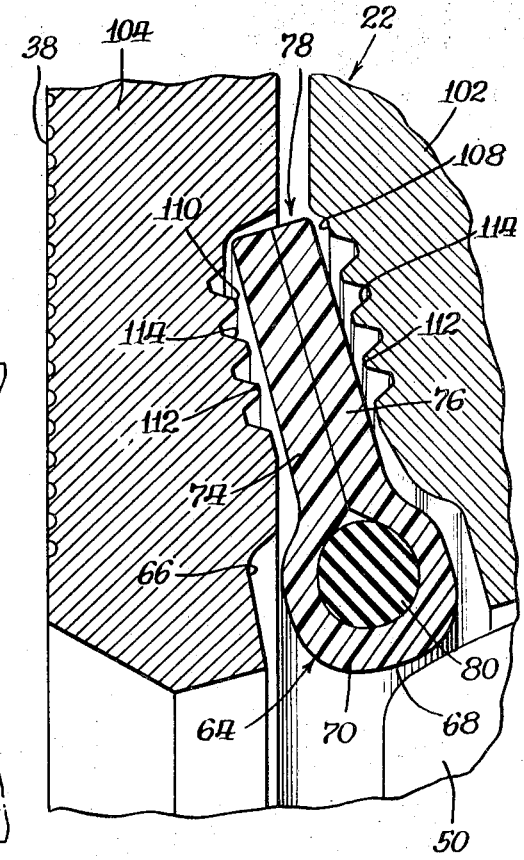

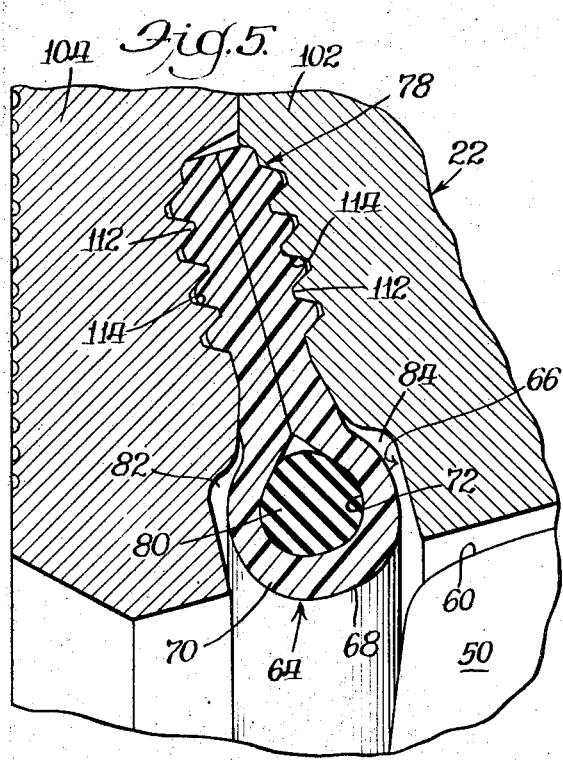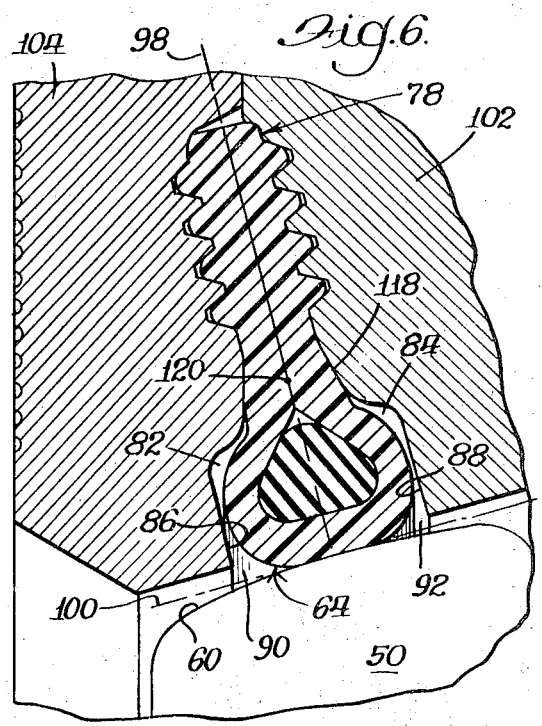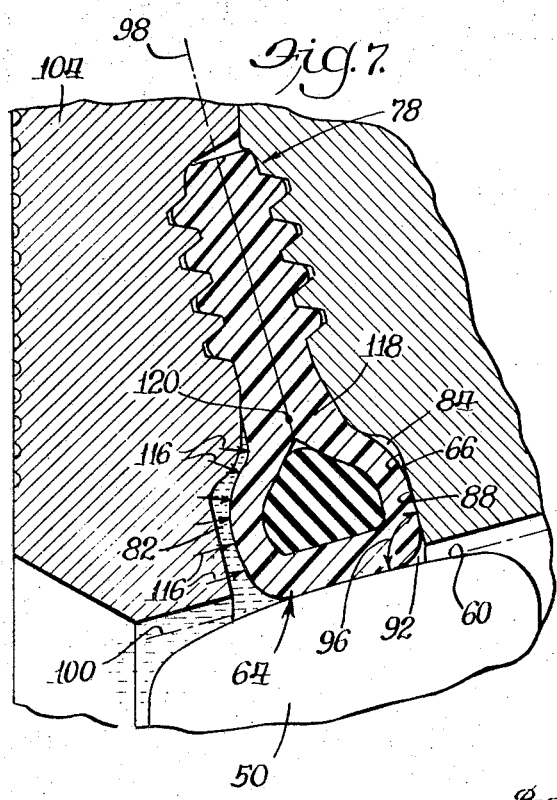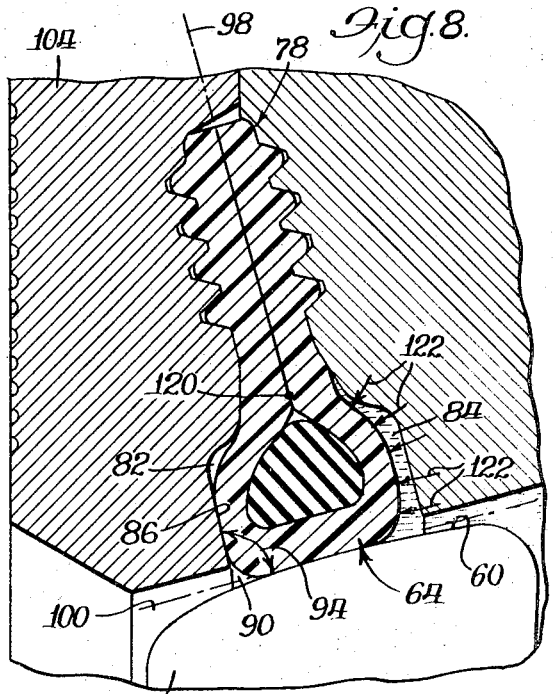

Inventor
Werner K. Priese
By: Burmeister, Palmatier & Hamby
Attys.

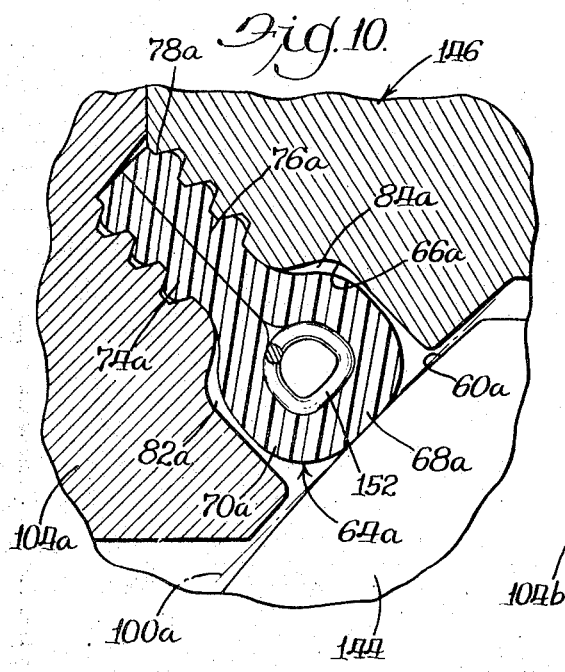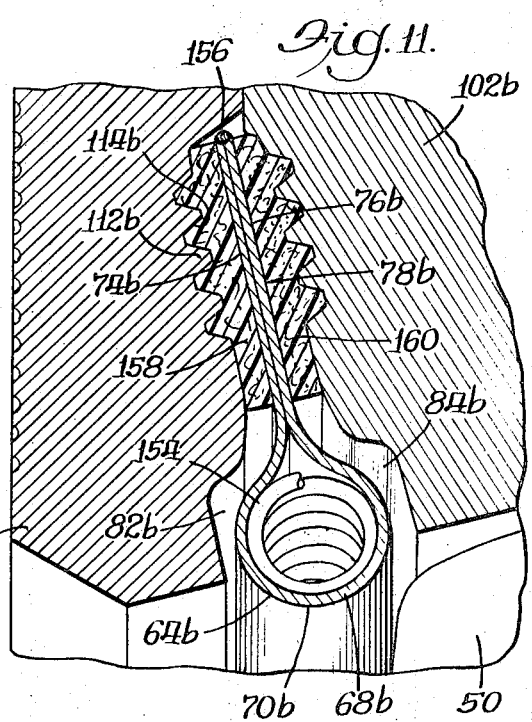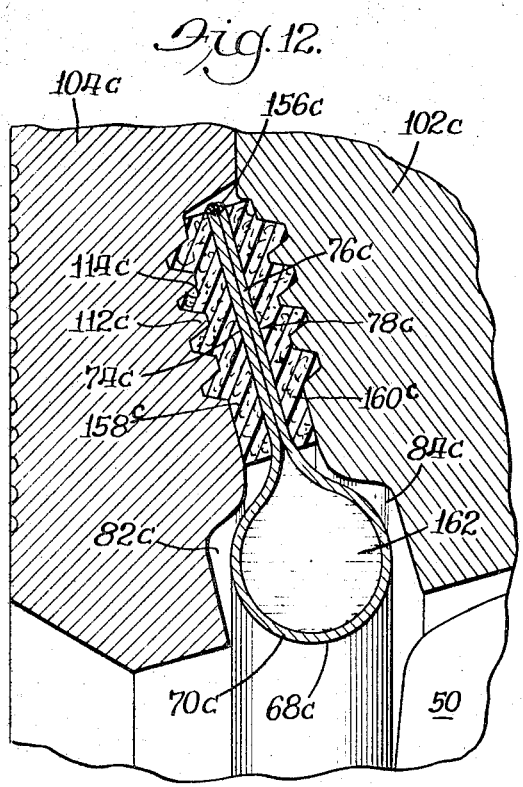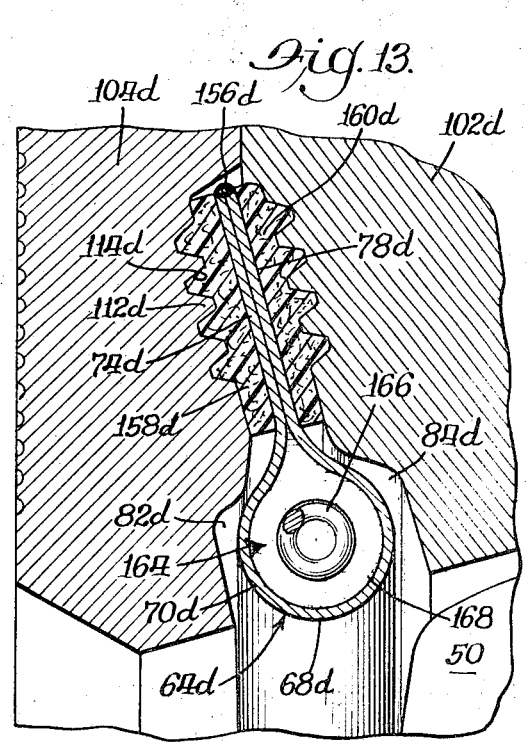

VALVE SEALED BY CALKING RING ANCHORED IN SUPPORT GROOVE

The present invention relates to valves.

One object of the invention is to provide an improved valve that is initially sealed mechanically against lead leakage by a dynamic calking ring accommodated within and supported by a support groove in confronting relation to a sealing surface and being movably anchored in the groove by an integral flange in such manner that differential fluid pressure in either direction on the valve is immediately applied fully to the calking ring and acts on the ring in conjunction with surfaces of the support groove to intensify sealing of the valve by a dynamic calking action of the ring against the sealing surface having a maximized effectiveness with respect to differential fluid pressures in either direction on the valve.

A more specific object is to provide an improved valve as recited in which differential fluid pressure of any intensity and in either direction through the valve is fully applied immediately to substantially the entire upstream surface of the calking ring to produce a dynamic displacement of the ring that is directed by the differential fluid pressure itself and by the downstream side surface of the ring support groove against the sealing surface confronting the calking ring in such manner that the valve is effectively sealed by a calking action of the ring against the confronting sealing surface that is maximized to great advantage for all degrees of differential pressure on the valve and with equal effectiveness with reference to differential fluid pressures in either direction on the valve while at the same time providing for secure retention of the calking ring in its support groove by means of an anchoring flange integral with the ring.

Another object is to provide an improved valve of the character recited having an improved construction which enables a calking ring of flexible construction secured against dislodgement from a coacting support groove by an anchoring flange integral with the calking ring to engage an opposing sealing surface and initially seal the valve mechanically as an incident to closure of the valve and thereafter respond to differential fluid pressure on the valve to produce a pressure actuated calking action of the ring directed by the downstream side surface of the ring groove against the opposing sealing surface and being fully effective with respect to differential fluid pressure in either direction on the valve by virtue of the orientation of the anchoring flange of the calking ring with respect to the opposing sealing surface.

A further object is to provide an improved valve of the character recited in which a dynamic calking ring held against dislodgement from a movable working position within a support groove by means of an integral anchoring flange is caused to exert an improved and highly effective calking action against an opposing sealing surface, which calking action is highly effective in sealing the valve by virtue of an improved physical relationship of the calking ring to its support groove which relationship immediately upon closing of the valve to apply upstream fluid pressure substantially to the entire upstream surface area of the calking ring to force the calking ring against the opposing sealing surface under the direction of the upstream fluid pressure itself and under the guidance of the downstream side surface of the ring support groove.

Another object is to provide an improved valve of the above character in which the residual pressure of the calking ring exerted mechanically against the opposing sealing surface is limited to a very modest value when no differential fluid pressure is applied to the valve and the pressure of the calking ring against the sealing surface is dynamically increased in response to the application of differential fluid pressure to the valve by direct action of such differential fluid pressure to substantially the entire upstream area of the calking ring for all degrees of such differential fluid pressure.

A further object is to provide an improved valve of the above character having an improved construction affording the advantages recited in the foregoing objects while at the same time having the capability of withstanding without damage very high temperatures.

A more specific object is to provide an improved valve as recited affording the advantages referred to and providing further advantages gained through sheathing the calking ring in metal, the calking ring being otherwise formed electively either wholly or in part of metal.

Another object is to provide an improved disc valve of the character recited in the preceding objects.

Another object is to provide an improved ball valve of the character recited in the preceding objects.

A further object is to gain the objectives of the foregoing objects by means of a valve of improved construction that is inherently well suited for economical manufacture and exceptionally serviceable in use.

Other objects and advantages will become apparent from the following description of the exemplary embodiments of the invention illustrated in the drawings, in which:

FIG. 1 is an end view of a disc valve of preferred construction incorporating the invention;

FIG. 2 is a vertical sectional view taken generally with reference to the line 2—2 in FIG. 1 and illustrating in phantom the positions of conduits connected to the valve;

FIG. 3 is a simplified horizontal sectional view taken with reference to the line 3—3 in FIG. 1;

Figure 9:
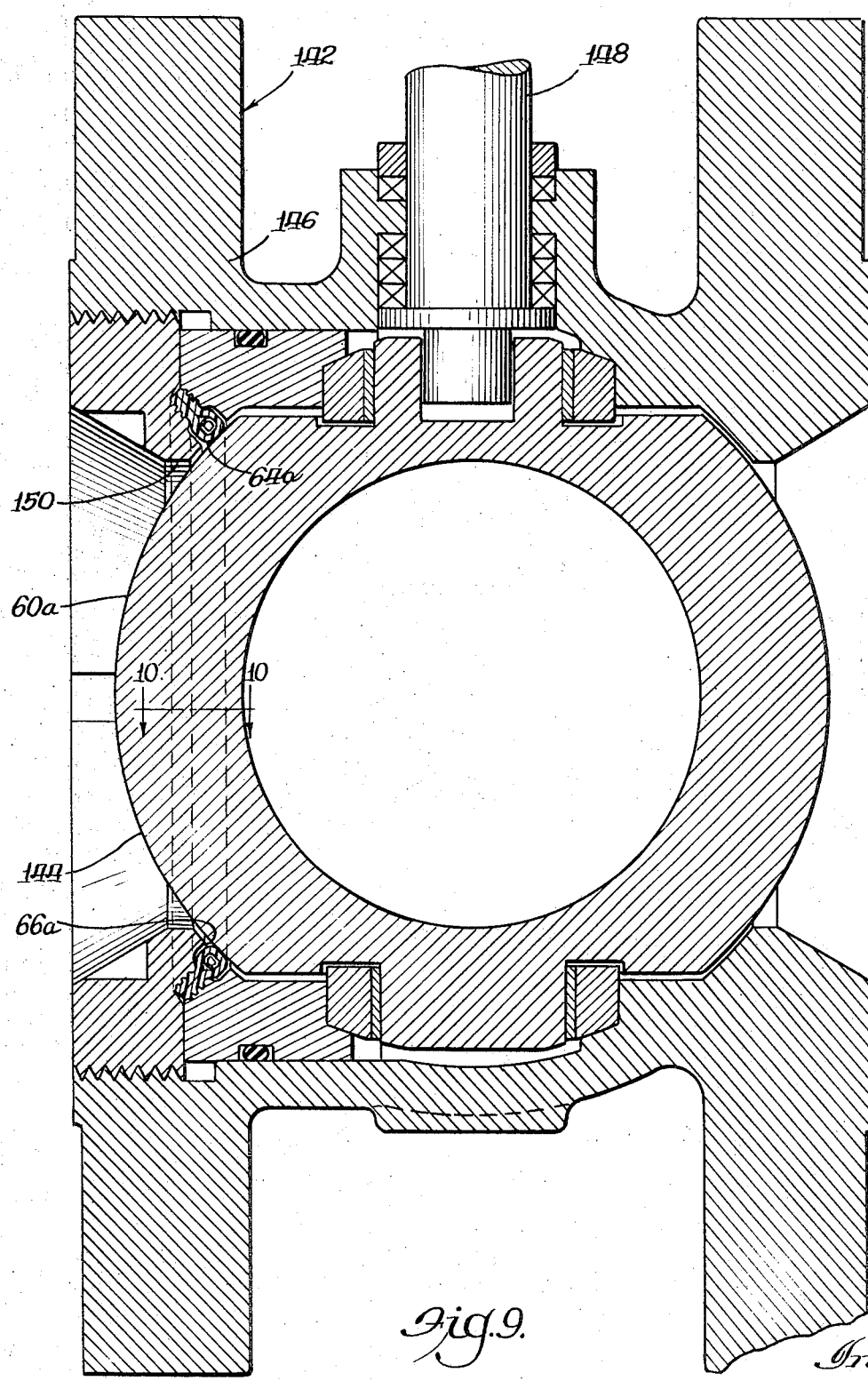

FIG. 4 is a fragmentary sectional view on an enlarged scale taken generally with reference to the line 4—4 of FIG. 2 and illustrating the relationship of the calking ring and its integral support flange to coacting parts before the coacting parts are drawn together in the assembly of the valve to clamp the anchoring flange, the corresponding position of the annular sealing surface appearing in this FIG;

FIG. 5 is a view similar to FIG. 4 but showing the position of the parts after being drawn together in the assembly of the valve to clamp the anchoring flange of the calking ring, the coacting sealing surface on the valve disc being shown displaced from its closed position in engagement with the calking ring;

FIG. 6 is a view similar to FIG. 5 but illustrating the position of the parts with the valve closed and sealed initially by mechanical engagement of the calking ring with the opposing sealing surface;

FIG. 7 is a view similar to FIG. 6 but illustrating the calking ring dynamically displaced to one side in its support groove by a calking action energized by differential fluid pressure on one side of the closed valve;

FIG. 8 is a view similar to FIG. 7 but showing the calking ring displaced to the opposite side of its support groove and urged by fluid pressure in a calking action against the sealing surface by differential pressure on the other side of the closed valve;

FIG. 9 is a longitudinal sectional view of a ball valve incorporating the invention;

FIG. 10 is a transverse sectional view on an enlarged scale taken generally with reference to the line 10—10 of FIG. 9 and showing the positional relationship of a calking ring of modified construction to coacting parts when the valve is closed with no differential pressure acting the valve;

FIG. 11 is a transverse sectional view similar to FIG. 5 but showing a calking ring and support flange of modified construction;

FIG. 12 is a view similar to FIG. 11 but illustrating another calking ring and support flange of modified construction; and FIG. 13 is a transverse sectional view similar to FIG. 11 and illustrating another modification of the construction of the calking ring and support flange.

Referring to the drawings in greater detail, the disc valve 20, incorporating the preferred construction of FIGS. 1 through 8, comprises a valve body 22 defining a flow passage 24 extending therethrough and being adapted at opposite ends of the flow passage 24 for connection in a conventional manner with coacting conduits 26, 28 illustrated in phantom in FIG. 2.

With reference to the construction illustrated, attachment flanges 30, 32 fitted on the respective conduits 26, 28 are pulled toward each other by an annular series of bolts 33, FIG. 2, in a conventional manner to make sealed connections through gaskets 34, 36 with generally flat faces 38 40 on opposite sides of the valve body 22 encircling opposite ends of the passage 24. Clearance for such bolts is provided by holes 42, 44 in reinforcing webs 46, 48 formed on the upper and lower sides of the valve body 22 as shown in FIG. 1.

The flow passage 24, FIG. 2, is opened and closed by turning of a flow control disc 50 between the closed position illustrated in solid lines in FIG. 3 and the open position illustrated in solid lines in FIG. 3 and the open position illustrated in phantom in FIG. 3.

The flow control disc 50 is supported in the valve body 22 and rotated between its open and closed positions by means of a support shaft 52 extending through a bore 54 defined in a diametrical enlargement 56 formed on one side of the disc 50 for accommodation of the support shaft. The disc 50 is secured in a fixed post position in relation to the shaft 52 by tapered anchoring pins 58 extending transversely through the shaft into the disc enlargement 56 as shown in FIG. 2.

The periphery of the disc 50 defines an annular sealing surface 60, which is crowned in transverse section as illustrated best in FIGS. 6, 7 and 8, having preferably a spherical curvature, the center of curvature of the annular sealing surface 60 being identified by the reference number 62 in FIG. 3.

Upon turning of the flow control member or disc 50 to its closed position, FIGS. 1, 2, 3, and 6, through 8, the annular sealing surface 60 is brought into confronting relation to a calking ring 64 movably anchored in an annular calking ring support groove 66 formed in the valve body 22 to confront the annular sealing surface 60 in close proximity to the sealing surface when the valve is closed.

As will be described, the physical relationship of the calking ring support groove 66 to the calking ring 64 and to the sealing surface 60 and the manner in which the calking ring 64 is movably anchored in the groove 66 are devised to provide an improved dynamic calking of the valve against leakage when closed.

In the construction illustrated in FIGS. 2 through 9, the calking ring 64 comprises a sheath 68 of flexible material having a bulbous, ringlike annular portion 70 encasing an annular plenum space 72, FIG. 5. The sheath 68 has two marginal edges 74, 76 extending away from the bulbous annular portion 70 of the sheath in direct contact with each other to form in integral relation to the bulbous portion 70 an annular anchoring flange 78. The annular plenum space 72 encased within the sheath 68 contains an annular body 80 of filler material suitable for sustaining the encasing bulbous portion 70 of the sheath 68 against collapse under fluid pressure.

With reference to the construction described, the annular body 80 of filler material together with the encasing portion 70 of the sheath 68 form the calking ring 64.

In the construction if FIGS. 1 to 8, the annular body 80 of filler material, which forms the annular core of the calking ring 64, is formed by an O-ring of rubber or other suitable elastomeric or yieldable polymeric material of suitable rheological properties such as will be referred to later. The sheath 68 encasing the O-ring 80 and forming the integral anchoring flange 78 is formed in this instance of a suitable semiyieldable polymeric material, specifically polytetrafluoroethylene, sold commercially under the trademark "Teflon." Other materials useable in constructing the calking ring 64 and anchoring flange 78 will be presently referred to.

It may be noted that by virtue of the marginal edges 74, 76 of the sheath 68 being in direct contact with each other, the anchoring flange 78 has a thickness that is decidedly less than the corresponding width measured in the same direction of the calking ring 64 formed as described by the O-ring 80 encased within the bulbous medial portion 70 of the sheath 68. The advantage of this physical relationship of the parts in maximizing the strength by which the calking ring 64 is retained movably in its working position while at the same time providing for optimum dynamic displacement of the calking ring into most effective calking positions by differential fluid pressures on the valve in either direction will appear presently.

As previously intimated, the calking ring 64 is movably disposed in the annular seat support or calking ring groove 66. As illustrated best in FIGS. 5 and 6, the support groove 66 has a lateral width, measured transversely in relation to the depth of the groove, that materially exceeds the corresponding lateral width of the calking ring 64 to provide at opposite sides of the groove annular spaces 82, 84 opening into the groove along opposite sides of the calking ring 64 and extending, as shown in FIGS. 5 and 6, past the body of the calking ring into overlapping relation to opposite sides of the adjacent portion of the anchoring flange 78. As will presently appear, the spaces 82, 84 function as pressure-actuating chambers or plenum spaces into which fluid can freely enter the groove 66 to exert calking pressure against the calking ring 64 from either side and from behind the ring. Moreover, the annular spaces 82, 84 extending back into overlapping relation to the anchoring flange 78 serve alternately as clearance spaces providing for dynamic displacement of the calking ring 64 into calking positions.

The calking ring support groove 66 which confronts the sealing surface 60 in close proximity to the sealing surface when the flow control member 50 is in its closed position, FIGS. 6, 7 and 8, is shaped as viewed in transverse section to define on opposite sides of the calking ring 64 two annular side surfaces 86, 88 oriented to form with the sealing surface 60 two annular calking corners identified in FIGS. 6, 7 and 8, by the reference numbers 90, 92. To obtain maximum effectiveness in dynamic calking of the valve against leakage around the flow control member 50, the groove side surfaces 86, 88 are oriented in relation to the sealing surface 60 so the that the annular corners 90, 92 have transverse interior corner angles 94, FIG. 8, and 96, FIG. 7, that are free individually of any material degree of obtuseness; that is, the individually angles do not materially exceed 90°. Thus, in the preferred construction, the transverse interior angles 94, 96 of the annular corners 90, 92 are generally limited, to obtain maximum calking effectiveness, to right angles or smaller angles so that the groove side surfaces 86, 88 aid, as will presently appear, in guiding the calking ring 64 under the force of differential fluid pressure into a calking relation to the respective corners 90, 92.

The annular anchoring flange 78, integral with the calking ring 64, extends into the valve body 22 below the bottom of the groove 66 in a predetermined direction oriented in relation to the adjacent sealing surface 60 so that the calking ring 64 anchored against dislodgement from the groove 66 by means of the anchoring flange 78, as will be described, functions with equal effectiveness in dynamically calking the valve against leakage in either direction past the sealing surface 60.

More particularly, the annular flange 78 is oriented so that the center line 98 of the flange as viewed in transverse section, FIGS. 6 to 8, is generally perpendicular to a transverse reference line 100 tangent to the post position occupied by the adjacent portion of the sealing surface 60 when the valve is closed. While the orientation of the anchoring flange 78 may deviate somewhat for manufacturing convenience from the described relation of perpendicularity to the transverse reference line 100 tangent to the sealing surface 60, such deviation should be limited so that it does not exceed an angle of 15° deviation from the optimum position of perpendicularity to the transverse line of tangency 100. As shown in FIG. 6, the anchoring flange 78 and groove side surfaces 86, 88 supporting the calking ring 64 are mutually parallel.

The annular anchoring flange 78 is locked in the body 22 by being clamped between the principal component 102 of the valve body 22 and an annular clamping and connecting ring 104 also constituting a component of the valve body and being secured to the component 102 by an annular series of cap screws 106, FIG. 1. The main body component 102 of the valve body 22 is shaped to define one side of the calking ring accommodating groove 66, FIGS. 4 and 5, and the clamping and connecting ring 104 is shaped to define the opposite side of the groove 66, the two sides of the groove being mirror images of each other in the preferred construction.

The calking ring anchoring flange 78 extends from the calking ring 64 into the body 22 below the bottom of the groove 66 and is accommodated within a recess 108 formed in the side of the major body component 102 and an opposing recess 110 formed in the clamping ring 104. The bottoms of the respective recesses 108, 110 are shaped, as shown in FIG. 4, to define a concentric series of alternate lands 112 and grooves 114 designed respectively to penetrate and receive adjacent portions of the yieldable polymeric anchoring flange 78 upon drawing of the ring 104 into its assembled position by tightening the screws 106, the dimensional relationships of the parts being such that the concentric lands 112 are forced part way into the flange 78 displacing flange structure into the grooves 114 so that the flange is securely anchored against dislodgement.

When the flow control member 50 is turned to its closed position, FIGS. 1, 2, 3 and 6, the valve is initially sealed mechanically by mechanical engagement of the calking ring 64 with the opposing sealing surface 60, the seal thus established mechanically being effective to prevent the passage of fluid under moderate differential pressure between the calking ring and the sealing surface 60. The anchoring flange 78 formed integrally with the calking ring 64 and fixed as described to the valve body 22 prevents leakage of fluid between the calking ring and the valve body.

Initial sealing of the valve mechanically as an incident to closing of the valve, as illustrated in FIGS. 3 and 6, is provided by making the inner diameter of the calking ring 64 somewhat smaller than the diameter of the annular portion of the sealing surface 60 which engages and expands somewhat the opposing portion of the calking ring 64 as the flow control member 50 is moved into its closed position, FIG. 6. Mechanical deflection of the calking ring 64 by the sealing surface 60 moving into its closed valve position reshapes an annular segment of the bulbous portion of the calking ring engaged by the sealing surface 60 to fit the curvature of the sealing surface 60 with which the calking ring is in contact, FIG. 6.

Even when the valve is initially sealed mechanically in its closed position as described, fluid on opposite sides of the sealing engagement of the calking ring 64 with the sealing surface 60 can enter freely into the annular plenum spaces or pressure chambers 82, 84 defined within the support groove 66 on opposite sides of the calking ring 64 and extending into overlapping relation to adjacent annular portions of the flange 78 as described.

In the event the fluid pressures thus established within the two calking ring actuating chambers 82, 84 are unequal, a condition which ensues immediately upon subjection of the closed valve to differential fluid pressure, the higher of the fluid pressures within the respective annular chambers 82, 84 functions immediately to apply a calking pressure to the calking ring 64 from the upstream side and the back side of the calking ring. The dynamic displacement of the calking ring 64 which ensues to calk the valve against increasing differential fluid pressure is illustrated in FIG. 7, the assumption being made with reference to FIG. 7 that the higher fluid pressure is on the left-hand side of the calking ring.

The forces of the pressure of the fluid under the higher pressure acting on the calking ring 64 from within the high pressure actuating chamber or space 82 are represented graphically by small arrows 116.

It should be noted in this respect, FIG. 7, that action of the forces 116 of high pressure fluid against an annular portion of the back or the groove bottom side of the calking ring as well as against the entire high pressure side of the calking ring is provided for by the fact that the actuating chamber 82 extends through the groove 66 into overlapping relation to the adjacent annular portion 118 of the flange 78. At the same time, the overlapping relation of the plenum space 84 to the annular portion 118 of the flange 78 adjacent the calking ring 64 provides clearance space for dynamic displacement or swinging of the calking ring 64 into the downstream annular corner 92 defined as previously described by the opposing sealing surface 60 and the downstream side surface 88 of the ring support groove 66.

The preferred orientation previously described of the downstream side surface 88 of the groove 66 in relation to the sealing surface 60, so that the transverse interior angle 96 of the corner 92 lacks any material degree of obtuseness, serves to advantage in supporting the calking ring 64 against the applied force of upstream fluid while at the same time enabling the forces of the high pressure fluid against the upstream side and a portion of the back of the calking ring to urge the ring dynamically with maximum calking effectiveness into the downstream annular corner 92 to seal the valve with a sealing effectiveness that increases progressively with any increases in the differential fluid pressure applied to the closed valve.

At this juncture, it should be pointed out that by virtue of the construction provided and described, the valve is sealed with substantially equal effectiveness against differential fluid pressure applied in either direction to the valve when closed.

As previously described, the anchoring flange 78 is oriented to be perpendicular within 15° to a transverse reference line 100 tangent to the closed position of the sealing surface 60 and the annular portion 118 of the anchoring flange adjacent the calking ring 64 has a thickness distinctly less than the corresponding thickness of the calking ring with the consequence that the calking ring 64 can swing with equal facility and effectiveness dynamically into either of the annular corners 90, 92 to caulk against differential fluid pressure applied from either side of the valve when closed. The calking ring 64 swings into either of the annular corners 90, 92 about an annular center of movement represented in FIGS. 6, 7 and 8 by the graphic point 120 disposed as shown along the flange portion 118 adjacent the calking ring.

The dynamic action which ensues as a consequence of differential fluid pressure being applied to the valve in the opposite direction is illustrated in FIG. 8, it being assumed in FIG. 8 that fluid under the higher pressure is on the right-hand side of the seal with the consequence that the fluid within the annular pressure chamber or plenum space 84 acts against the high pressure side and a portion of the back of the calking ring 64 as represented graphically by the arrows 122. The vector sum of the pressure forces 122 urges the calking ring 64 dynamically into the corner 90 where it is supported by the sealing surface 60 and the downstream side surface 86 of the groove 66 in such manner that an optimum calking action is obtained, the interior transverse angle 94 of the corner 90 preferably lacking any material degree of obtuseness as previously explained.

Dynamic displacement of the calking ring 64 into the annular corner 90, now located on the downstream side of the valve with reference to FIG. 8, has an effectiveness equal to the previously described displacement into the other annular corner 92 by virtue of the previously described orientation of the anchoring flange 78 in relation to the closed position of the opposite sealing surface 60 and the reduced thickness of the anchoring flange in relation to the calking ring itself.

As jammed into either of the annular corners 90, 92 by the calking action described, the resilient calking ring 64 is temporarily deformed under the calking force applied by the high pressure fluid and directed by the downstream support surface of the groove to spread the calking ring from the downstream corner along the sealing surface 60 to a degree that increases with increases in the differential fluid pressure on the calking ring, all to the end that a most efficacious and advantageous seal against leakage of fluid is produced.

The valve 20 illustrated in the drawings is opened and closed by means of an operating handle 124 attached to one end of the rotary shaft 52 supporting the flow control member 50 and extending beyond the valve body 22 as shown in FIG. 1. The valve may be latched in either its open or closed position or in an intermediate position by a locking lever 126 pivoted at 128 to the handle 124 and coacting with a notched anchor sector 130 secured to the valve body 22. The control shaft 52 operated by the handle 124 and supporting the flow control member 50 is itself supported rotatably by two sleeve bearings 132, 134, FIG. 2, mounted in the body 22 adjacent the flow control member 50, Seals 136, 138 encircle the shaft 52 outboard of the bearings 132, 134 to seal the valve against the escape of fluid along the shaft 52.

As illustrated graphically in FIG. 3, the bore 54 formed in the flow control member 50 to receive the control shaft 52 is oriented so that the control shaft axis identified in FIG. 3 by the number 140 is eccentrically positioned to a slight degree in relation to the center of curvature of the sealing surface 60, identified in FIG. 3 by the number 62, with a consequence that the sealing surface 60 applies its maximum degree of mechanical pressure to the calking ring 64 only during the final phase of closing movement of the flow control member 50.

As previously indicated, the sheath 68 encasing the calking ring core 80 and forming the integral anchoring flange 78 of the valve 20 illustrated may be formed of a semiyieldable polymeric material such, for example, as polytetrafluoroethylene. The selection of the particular material used to construct the sheath 68 should be made in the light of the physical and chemical character of the fluid that will flow through the valve. Mindful of the necessity of taking into account the character of the fluids in the environment, other materials that can be used in the construction of the sheath 68 include high molecular weight polyethylene, polyvinylidenefluoride, polyimide, monochlorotrifluoroethylene, and urethanes of suitable physical properties. The pressure sustaining O-ring or core 80, protected by the encasing sheath 68, can be selected from various resilient or rubberlike materials including a wide variety of elastomers such, for example, as silicone rubber, urethane, plasticized polyfluoroelastomers and various compounded matrices available commercially and having limited thermal expansion characteristics which are useful in various controlling fluids under high temperatures. In some instances, it may be preferable to form the calking ring 64 and anchoring flange 78 in one piece from a suitable yieldable polymeric material such, for example, as an ethylenepropylene polymer, a fluorinated elastomer, urethane, chlorinated sulfonated polyethylene, or other yieldable polymeric material of suitable physical properties.

A ball valve constituting a modified embodiment of the invention is illustrated in FIGS. 9 and 10 wherein various components constituting counterparts of the valve 20 previously described are denoted by the same reference numbers with the addition of the suffix a.

The valve 142 comprises a flow control ball 144 disposed within a valve body 146 and rotated between open and closed positions by a control stem 148 to open and close a passage 150 defined within the body 146.

A spherically curved sealing surface 60a on the ball 144 confronts an annular calking ring 64a supported within a ring support groove 66a in the valve body 146 in the manner provided by the invention.

In this instance, FIGS. 9 and 10, the calking ring 64a is formed structurally by a sheath 68a of yieldable polymeric material having an annular bulbous portion 70a encasing a resilient annular core or filler 152 constituted structurally by a helically wound annular spring also denoted by the number 152.

It should be particularly noted that the anchoring flange 78a formed by the mutually engaged marginal edges 74a, 76a of the sheath 68a is oriented as taught by the foregoing description to be perpendicular within 15° to a transverse tangent 100a to the sealing surface 60a engaged by the calking ring.

The material used in forming the sheath 68a of FIGS. 9 and 10 can be generally similar to that forming the sheath 68 of the valve 20 of FIGS. 1 through 8. The helically wound annular spring 152 serves to sustain the annular bulbous portion 70a of the sheath against collapse under fluid pressure applied against the back and the upstream side of the calking ring by fluid in either of the pressure-actuating chambers 82a, 84a defined within the groove 66a in the manner previously described.

A modification of the valve 20 especially adapted for high-temperature service is illustrated in FIG. 11 in which component elements constituting counterparts of components of the valve of FIG. 1 through 8 are identified by the same reference numbers with the addition of the suffix b.

For such high-temperature service, the sheath 68b of the calking ring 64b is formed of a hard springy metal having a high order of corrosion resistance and resistance to heat. Metals that may be used in forming the sheath 68b include stainless steel, inconel, and other alloys and metals of suitable physical properties. The bulbous annular portion 70b of the sheath 68b is supported against collapse in this instance by an internal annulus or core 154 formed of helically wound metal, selected to have great strength and resilience that is retained under elevated temperatures.

The anchoring flange 78b is formed by mutually contacting marginal edges 74b, 76b of the sheath 68b preferably sealed together at their extreme edges by a bead weld 156. The anchoring flange 78b thus formed is gripped securely between two flat annular washers 158, 160 formed of a suitable heat resistant material such, for example, as asbestos adapted to be firmly anchored by the concentric lands 112b and grooves 114b.

In another modified construction of the valve 20 illustrated in FIG. 12, components similar to those used in the valve of FIGS. 1 through 8 are identified by the same reference numbers with the addition of the the suffix c.

The bulbous annular portions 70c of the sheath 68c of the modified construction of FIG. 12 is sustained against the force of external pressure by an annular core 162 formed of a suitable resilient or fluent composition capable of sustaining pressure without extensive compression while being deformable under pressure loads. A substantial number of compositions having such physical capabilities are commercially available.

Another variant of the valve adapted for high-temperature service is illustrated in FIG. 13, components of the valve structure of FIG. 13 forming counterparts of the valve structure of FIG. 11 being denoted by the same reference numbers but with the use of the suffix d.

The calking ring 64d of FIG. 13 is formed of a metallic sheath 68d having a bulbous annular portion 70d filled by a core 164 comprising a helically wound annular spring 166 encased within annulus 168 of asbestos or other heat resistant material intervening between the spring 166 and the sheath 68d, the annulus 168 and the internal spring 166 working together to support the bulbous portion 70d of the sheath against collapse under pressure.

I claim:

1. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring support groove oriented to confront said sealing surface in close proximity thereto when said second element is in said closed position, said groove having opposite side surfaces which do confront said sealing surface when said second element is in its closed position to form with said sealing surface two annular calking corners each defining a transverse interior corner angle that is free of any material degree of obtuseness, said groove side surfaces being mutually oriented so that said groove has a transverse width that is substantially unnarrowed from the bottom to the top of the groove, an annular calking ring of flexible construction disposed in said groove, an annular anchoring flange of flexible construction integral with said calking ring; said anchoring flange extending away from the top of the groove and having a thickness adjacent said calking ring that is distinctly less than the transverse thickness, measured in the same direction, of the calking ring; said groove having a lateral width measured transversely with respect to the depth of the groove that is materially greater than the corresponding width of said calking ring thus providing in opposite sides of the groove annular pressure chambers opening into the groove alongside opposite sides of said calking ring and extending to said anchoring flange to allow upstream fluid on either side of the calking ring to enter freely into the groove in pressure contact with the corresponding side and back of the calking ring, and means securing an annular portion of said anchoring flange immovably to said other element in a fixed position with respect to said other element in which said annular anchoring flange is perpendicular within 15° to a transverse reference line tangent to the position occupied by the adjacent portion of said sealing surface when said second element is in said closed position thereof so that said calking ring is constrained by said anchoring flange against dislodgement from said groove while being swingable with reference to said other element to either side of said groove by the force of upstream fluid pressure in either of said pressure chambers to be jammed by such upstream pressure into a calking position in the downstream one of said calking corners formed by the opposing sealing surface and the downstream side surface of said groove when said second element is in said closed position to effectively seal off leakage of fluid past said sealing surface when the valve is subjected to differential pressure in either direction.

2. A valve comprising, in combination, a first element constituting a valve body defining a flow passage extending therethrough, a second element constituting a flow control member movably supported on said body for movement relative thereto between an open position and a closed position for opening an closing said flow passage, one of said elements defining an annular sealing surface oriented thereon to be proximate to the periphery of said passage when said second element is in its closed position, the other of said elements defining an annular calking ring support groove oriented to confront said sealing surface in close proximity thereto when said second element is in said closed position, said groove having on opposite sides thereof two calking ring support surfaces which confront said sealing surface when said second element is in its closed position to form with said sealing surface two annular calking corners each having a transverse interior corner angle limited so as not to exceed materially 90°, an annular calking ring of flexible construction disposed in said groove, an annular anchoring flange integral with said calking ring and extending therefrom away from the top of said groove; said groove having a lateral width, measured transversely with respect to the depth of the groove, that is materially greater than the corresponding lateral width of said calking rings so that the groove and the calking ring together define two annular pressure chambers extending into the groove along opposite sides of the calking ring to the backside of the calking ring to allow upstream fluid on either side of the calking ring to freely enter the groove in pressure contact with the respective sides and back of the calking ring, said anchoring flange having a thickness adjacent said calking ring that is distinctly less than said lateral width of the calking ring; and means securing an annular portion of said anchoring flange immovably to said other element in a fixed position with respect to said other element in which said annular anchoring flange is generally perpendicular to a transverse reference line tangent to the position occupied by the adjacent portion of said sealing surface when said second element is in said closed position thereof so that said calking ring is constrained by said anchoring flange against displacement from said groove while being freely swingable transversely in either direction in said groove by upstream fluid pressure in either of said pressure chamber to be jammed by such upstream pressure into a calking position in the downstream annular corner formed by the opposing sealing surface and the downstream side surface of said groove when said second element is in said closed position to effectively seal off leakage of fluid past said sealing surface when the valve is subjected to differential pressure in either direction.

3. A disc valve comprising, in combination, a valve body defining a flow passage extending therethrough, a flow control disc movably supported on said body for rotation between an open position and a closed position for opening and closing said flow passage, said flow control disc defining an annular sealing surface oriented thereon to be proximate to the periphery of said passage when said disc is in said closed position, said sealing surface having a convex curvature in transverse section, said body defining an annular calking ring support groove oriented to confront said sealing surface in close proximity thereto when when said disc is in said closed position; said groove having two opposite side surfaces oriented to define with said sealing surface, when said disc is in its closed position, two annular calking corners each defining a transverse interior angle that is free of any material degree of obtuseness; an annular calking ring of resilient construction disposed in said groove, a flexible annular anchoring flange on said calking ring extending away from the top of the groove and having a thickness adjacent said calking ring that is distinctly less than the corresponding thickness of the calking ring, and means securing an annular portion of said anchoring flange to said valve body in a fixed position thereon in which said annular anchoring flange is perpendicular within 15° to a transverse reference line tangent to the position occupied by the adjacent portion of said sealing surface when said disc is in said closed position thereof so that said calking ring is constrained by said anchoring flange against dislodgement from said groove while being freely swingable transversely with reference to said groove to be jammed by the force of upstream fluid pressure into a calking position in the downstream one of said calking corners when said disc is in its closed position to effectively calk the valve against leakage past said sealing surface when the valve is subjected to differential pressure in either direction.

4. A valve comprising, in combination, a first element constituting a valve body defining a flow passage extending therethrough, a second element constituting a flow control member movably supported on said body for movement relative thereto between an open position and a closed position for opening an closing said flow passage, one of said elements defining an annular sealing surface oriented thereon to be proximate to the periphery of said passage when said second element is in said closed position, the other of said elements defining an annular valve seat groove oriented to confront said sealing surface in close proximity thereto when said second element is in said closed position, said groove having side surfaces which confront said sealing surface when said second element is in said closed position to form with said sealing surface two annular corners each defining a transverse interior corner angle that is free of any material degree of obtuseness, an O-ring of resilient construction disposed in said groove, an annular sheath of flexible material encasing said O-ring to form an annular calking ring disposed in said groove; said sheath having two marginal edges extending from said calking ring in direct contact with each other to form an anchoring flange having a thickness adjacent said calking ring that is decidedly less than the corresponding width, measured in the same direction, of the calking ring; said calking ring having a lateral width, measured transversely with respect to the depth of the groove, that is materially less than the corresponding width of said groove, thus providing at opposite sides of the groove annular plenum spaces opening into the groove and extending to the bottom thereof to allow fluid to freely enter the groove in contact with the respective sides of said calking ring up to said anchoring flange; and means securing an annular portion of said anchoring flange immovably to said other element in a fixed position with respect to said other element in which said annular anchoring flange is perpendicular within 15° to a transverse reference line tangent to the position occupied by the adjacent portion of said sealing surface when said first element is in said closed position thereof so that said calking ring is constrained by said anchoring flange against dislodgement from said groove while being swingable with reference to said other element to either side of said groove to be jammed, by the pressure of fluid in the upstream one of said plenum spaces, into a calking position in either of said annular corners formed by the opposing sealing surface and the respective side surfaces of said groove when said second element is in said closed position to effectively seal off leakage of fluid in either direction past said sealing surface.

5. A valve comprising, in combination, a first element constituting a valve body defining a flow passage extending therethrough, a second element constituting a flow control member movably supported on said body for movement relative thereto between an open position and a closed position for opening and closing said flow passages, one of said elements defining an annular sealing surface oriented thereon to be proximate to the periphery of said passage when said second element is in said closed positions, the other of said elements defining an annular calking ring support groove oriented to confront said sealing surface in close proximity thereto when said second element is in said closed position, said groove having opposite side surfaces which confront said sealing surface when said second element is in said closed position to form with said sealing surface two annular calking corners, said groove side surfaces being mutually oriented so that said groove has a transverse width that is substantially unnarrowed from the bottom to the top of the groove, a flexible annular body of core material disposed in said groove, an annular sheath of flexible material encasing said annular body to form therewith an annular calking ring disposed in said groove; said annular sheath having two marginal edges extending from said calking ring in direct contact with each other to form an anchoring flange having a thickness adjacent said calking ring that is decidedly less than the corresponding lateral width, measured in the same direction, of the calking ring; said groove having a lateral width measured transversely with respect to the depth of the groove that is materially greater than the corresponding lateral width of said calking ring to provide in opposite sides of the groove annular plenum spaces opening into the groove along opposite sides of said calking ring and extending into overlapping relation to said anchoring flange adjacent the calking ring to provide clearance for dynamic deflection of the calking ring in either direction transversely with respect to the groove and to allow upstream fluid on either side of the calking ring to freely enter the plenum space on the upstream side of the calking ring to apply upstream fluid pressure to the upstream side and back of said calking ring, and means securing an annular portion of said anchoring flange to said other element in a position with respect to said other element in which said annular anchoring flange is perpendicular within 15° to a transverse tangent to the position occupied by the adjacent portion of said sealing surface when said second element is in said closed position thereof so that said calking ring is constrained by said anchoring flange against dislodgement from said groove while being freely swingable transversely in either direction across the groove by the pressure of upstream fluid in either of said plenum spaces to be dynamically forced by upstream fluid pressure into a calking position in the downstream one of said annular calking corners to effectively seal off leakage of fluid past said sealing surface when the valve is subjected to differential pressure in either direction.

6. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring groove oriented to confront said sealing surface in close proximity thereto when said second element is in said closed position, said groove having side surfaces which confront said sealing surface when said second element is in its closed position to form with said sealing surface two annular corners each defining a transverse interior corner angle that is free of any material degree of obtuseness; an annular sheath of flexible material having a bulbous, ringlike annular portion encasing an annular core space; said sheath having marginal edges extending from said bulbous portion in mutual contact to form an annular anchoring flange, an annular body of filler material disposed in said core space to sustain the encasing bulbous portion of the sheath against collapse under fluid pressure and to form therewith a flexible calking ring, said calking ring being disposed in said groove and having a lateral width measured transversely with respect to the depth of the groove that is materially less than the corresponding width of said groove thus providing in opposite sides of the groove annular pressure chambers opening into the groove alongside opposite sides of said calking ring and extending to the groove bottom side of the calking ring to allow upstream fluid on either side of the calking ring to freely enter the groove in pressure contact with the respective sides and back of said calking ring, and means securing an annular portion of said anchoring flange to said other element in a position with respect to said other element in which said annular anchoring flange extends away from the position occupied by the adjacent portion of said sealing surface when said second element is in said closed position thereof so that said calking ring is constrained by said anchoring flange against dislodgement from said groove while being freely swingable transversely in either direction across said groove by upstream fluid pressure in either of said pressure chambers to be jammed by such upstream pressure into a calking position in the downstream one of said annular corners formed by the opposing sealing surface and the downstream side surface of said groove when said second element is in said closed position to effectively seal off leakage of fluid past said sealing surface when the valve is subjected to differential pressure in either direction.

7. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring support groove oriented to confront said sealing surface in close proximity thereto when said second element is in said closed position, an annular calking ring of resilient construction disposed in said groove, said groove having two opposite side surfaces oriented to define with said sealing surface when said second element is in its closed position two annular calking corners, said groove side surfaces being oriented relative to each other so that the groove has a transverse width that is substantially unnarrowed from the bottom to the top of the groove, an annular anchoring flange integral with said calking ring and extending therefrom into said other element; said groove having a lateral width measured transversely with respect to the depth of the groove that is materially greater than the corresponding lateral width of said calking ring so that the groove and calking ring together define two annular plenum spaces adjacent opposite sides of the calking ring entering the groove and extending to the backside of the calking ring, said anchoring flange having a thickness adjacent said calking ring that is distinctly less than said lateral width of the calking ring; and said anchoring flange having a fixed annular portion secured immovably to said other element in a position with respect to said other element in which said annular anchoring flange is perpendicular within 15° to a transverse reference line tangent to the position occupied by the adjacent portion of said sealing surface when said second element is in said closed position thereof so that said calking ring is constrained by said anchoring flange against dislodgement from said groove while being freely swingable transversely in either direction across said groove by upstream fluid pressure in either of said plenum spaces to be jammed by such upstream pressure into the downstream calking corner to effectively caulk the valve against leakage in the downstream direction when the valve is subjected to differential pressure in either direction.

8. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring support groove oriented to confront said sealing surface in close proximity thereto when said second element is in said closed position, said groove having two opposite side surfaces oriented to define with said sealing surface when said second element is in its closed position two calking corners, said groove side surfaces being oriented relative to each other so that the groove has a transverse width that is substantially unnarrowed from the bottom to the top of the groove, an annular calking ring of flexible construction disposed in said groove; a flexible annular anchoring flange on said calking ring extending away from the top of said groove and having a thickness adjacent said calking ring that is distinctly less than the lateral width, measured in the same direction, of the calking ring; and means securing an annular portion of said anchoring flange to said other element in a position with respect to said other element in which said annular anchoring flange is perpendicular within 15° to a transverse tangent to the position occupied by the adjacent portion of said sealing surface when said second element is in said closed position thereof so that said calking ring is constrained by said anchoring flange against dislodgement from said groove while being freely swingable transversely in either direction by upstream fluid pressure into the downstream calking corner to effectively calk the valve against leakage in the downstream direction when the valve is subjected to differential pressure in either direction.

9. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring support groove oriented to confront said sealing surface in close proximity thereto when said second element is in said closed position, an annular calking ring of flexible construction disposed in said groove, said groove having on opposite sides thereof two calking ring support surfaces oriented to define with said sealing surface when said second element is in its closed position two annular calking corners, said groove side surfaces being oriented relative to each other so that the groove has a transverse width that is substantially unnarrowed from the bottom to the top of the groove, an annular anchoring flange integral with said calking ring and extending from the side thereof adjacent the bottom of the groove, said groove having a lateral width measured transversely with respect to the depth of the groove that is materially greater than the corresponding lateral width of said calking ring so that the groove and calking ring together define two annular pressure chambers extending into the groove along opposite sides of the calking ring, said anchoring flange having a thickness adjacent said calking ring that is distinctly less than said lateral width of the calking ring; and means securing an annular portion of said anchoring flange to said other element in a position with respect to said other element in which said annular anchoring flange extends away from the position occupied by the adjacent portion of said sealing surface when said second element is in said closed position thereof so that said calking ring is constrained by said anchoring flange against dislodgement from said groove while being freely swingable transversely in either direction across said groove by upstream fluid pressure in either of said pressure chambers to be jammed by such upstream pressure into the downstream calking corner to effectively calk the valve against leakage in the downstream direction when the valve is subjected to differential pressure in either direction.

10. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring groove oriented to confront said sealing surface in close proximity thereto when said second element is in said closed position, said groove having side surfaces which confront said sealing surface when said second element is in its closed position to form with said sealing surface two annular corners each defining a transverse interior corner angle that is free of any material degree of obtuseness; an annular sheath of thin metal having a bulbous, ringlike annular portion encasing an annular core space; said sheath being flexible and having marginal edges extending from said bulbous portion in mutually overlapping relation to form an annular anchoring flange, an annular body of filler material disposed in said core space to sustain the encasing bulbous portion of the sheath against collapse under fluid pressure and to form therewith a flexible calking ring, said calking ring being disposed in said groove and having a lateral width measured transversely with respect to the depth of the groove that is materially less than the corresponding width of said groove thus providing in opposite sides of the groove annular pressure chambers extending into the groove alongside opposite sides of said calking ring to allow upstream fluid on either side of the calking ring to freely enter the groove in pressure contact with the respective sides of said calking ring, and means securing an annular portion of said anchoring flange to said other element in a position with respect to said other element in which said annular anchoring flange extends away from the position occupied by the the adjacent portion of said sealing surface when said second element is in said closed position thereof so that said calking ring is constrained by said anchoring flange against dislodgement from said groove while being freely swingably transversely in either direction across said groove by upstream fluid pressure in either of said pressure chambers to be jammed by such upstream pressure into a calking position in the downstream one of said annular corners formed by the opposing sealing surface and the downstream side surface of said groove when said second element is in said closed position to effectively seal off leakage of fluid past said sealing surface when the valve is subjected to differential pressure in either direction.

11. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring support groove oriented to confront said sealing surface in close proximity thereto when said second element is in closed position, said groove having two opposite side surfaces oriented to define with said sealing surface when said second element is in its closed position two annular calking corners, said groove side surfaces being oriented relative to each other so that the groove has a transverse width that is substantially unnarrowed from the bottom to the top of the groove, an annular calking ring disposed in said groove and comprising a flexible metal sheath encasing an annular core space, said calking ring including an annular body of filler material disposed in said core space to sustain the encasing bulbous portion of said metal sheath against collapse under fluid pressure, a flexible annular anchoring flange on said calking ring formed of flexible metal and extending away from the top of said groove; said anchoring flange having a thickness adjacent said calking ring that is distinctly less than the lateral width, measured in the same direction, of the calking ring; and means securing an annular portion of said anchoring flange to said other element in a position with respect to said other element in which said annular anchoring flange is perpendicular within 15° to a transverse tangent to the position occupied by the adjacent portion of said sealing surface when said second element is in said closed position thereof so that said calking ring is constrained by said anchoring flange against dislodgement from said groove while being freely swingable transversely in either direction by upstream fluid pressure into the downstream calking corner to effectively calk the valve against leakage in the downstream direction when the valve is subjected to differential pressure in either direction.

12. A valve according to claim 11 in which said annular body of filler material disposed in said core space of said calking ring sheath comprises a helically wound annular spring.

13. A valve according to claim 12 in which a layer of flexible filler material resistant to high temperatures in disposed within said annular core space in surrounding relation to said annular spring.

14. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring support groove oriented to confront said sealing surface in close proximity thereto when said second element is in said closed position, said groove having on opposite sides thereof two calking ring support surfaces oriented to define with said sealing surface when said second element is in its closed position two annular calking corners each defining a transverse interior angle that is free of any material degree of obtuseness, an annular calking ring of flexible construction disposed in said groove, a flexible annular anchoring flange on said calking ring extending away from the top of the groove, said groove having a lateral width measured transversely with respect to the depth of the groove that is materially greater than the corresponding lateral width of said calking ring so that the groove and calking ring together define two annular pressure chambers extending into the groove along opposite sides of the calking ring, and means securing an annular portion of said anchoring flange to said other element in a position with respect to said other element in which said annular anchoring flange extends away from the position occupied by the adjacent portion of said sealing surface when said second element is in said closed position thereof so that said calking ring is constrained by said anchoring flange against dislodgement from said groove while being freely swingable transversely in either direction across said groove by upstream fluid pressure in either of said pressure chambers to be jammed by such upstream pressure into the downstream calking corner to effectively calk the valve against leakage in the downstream direction when the valve is subjected to differential pressure in either direction.

15. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring support groove oriented to confront said sealing surface in close proximity thereto when said second element is in said closed position, said groove having two opposite side surfaces oriented to define with said sealing surface when said second element is in its closed position two annular calking corners, an annular calking ring of flexible construction disposed in said groove, an annular anchoring flange on said calking ring and extending away from the top of said groove, said groove having a lateral width measured transversely with respect to the depth of the groove that is materially greater than the corresponding lateral width of said calking ring so that the groove and calking ring together define two annular pressure chambers entering the groove and occupying the groove alongside opposite sides of the calking ring, and said anchoring flange having a fixed annular portion secured immovably to said other element in a position with respect to said other element in which said annular anchoring flange is perpendicular within 15° to a transverse reference line tangent to the position occupied by the adjacent portion of said sealing surface when said second element is in said closed position thereof so that said calking ring is constrained by said anchoring flange against dislodgement from said groove while being freely swingably transversely in either direction across said groove by upstream fluid pressure in either of said pressure chambers to be jammed by such upstream pressure into the downstream calking corner to effectively calk the valve against leakage in the downstream direction when the valve is subjected to differential pressure in either direction.

16. A valve comprising, in combination, a first element constituting a valve body defining a flow passage extending therethrough, a second element constituting a flow control member movably supported on said body for movement relative thereto between an open position and a closed position for opening and closing said flow passage, one of said elements defining an annular sealing surface oriented thereon to be proximate to the periphery of said passage when said second element is in its closed position, the other of said elements defining an annular calking ring support groove oriented to confront said sealing surface in close proximity thereto when said second element is in said closed position, said groove having two opposite side surfaces oriented to define with said sealing surface when said second element is in its closed position two annular calking corners, said groove side surfaces being oriented relative to each other so that the groove has a transverse width that is substantially unnarrowed from the bottom to the top of the groove, an annular calking ring of flexible construction disposed in said groove, a flexible annular anchoring flange on said calking ring extending away from the top of said groove, and means securing an annular portion of said anchoring flange to said other element in a position with respect to said other element in which said annular anchoring flange is perpendicular within 15° to a transverse tangent to the position occupied by the adjacent portion of said sealing surface when said second element is in said closed position thereof so that said calking ring is constrained by said anchoring flange against dislodgement from said groove while being freely swingable transversely in either direction by upstream fluid pressure into the downstream calking corner to effectively calk the valve against leakage in the downstream direction when the valve is subjected to differential pressure in either direction.

PO-1050
(5/69)

UNITED STATES PATENT OFFICE
CERTIFICATE OF CORRECTION

Patent No. 3,563,510        Dated 2/16/71

Inventor(s) Werner K. Priese / Barrington, Illinois

It is certified that error appears in the above-identified patent and that said Letters Patent are hereby corrected as shown below:

The word "calk" as appears throughout the patent, except column 6, line should read -- caulk --.

The word "calking" as appears throughout the patent, should read -- cau

In column 1, line 6, delete the word -- lead --

In column 2, line 57, before "the valve" insert -- on --

In column 3, lines 8 & 9, after "the open position" delete -- illustrated solid lines in Fig. 3 and the open position --

In column 4, line 34, the word "individually" should read -- individual -

In column 4, line 54, delete the word -- post --

In column 7, line 50, after the words "close a", insert -- flow --.

In claim 1 - Column 8, line 62, delete the word -- do --

In claim 2 - Column 9, line 32, the word "an" should read -- and --.

In claim 3 - Column 10, line 11, delete the first -- when --.

PO-1050
(5/69)

UNITED STATES PATENT OFFICE
CERTIFICATE OF CORRECTION

Patent No. 3,563,510      Dated 2/16/71

Inventor(s) Werner K. Priese / Barrington, Illinois.    PAGE - 2

It is certified that error appears in the above-identified patent and that said Letters Patent are hereby corrected as shown below:

In claim 4 - Column 10, line 41, the word "an" should read -- and --

In claim 8 - Column 13, line 22, after the word "two" insert -- annular --

In claim 13, - Column 15, line 30, the word "in" should read -- is --.

Signed and sealed this 7th day of December 1971.

(SEAL)
Attest:

EDWARD M. FLETCHER, JR.
Attesting Officer

ROBERT GOTTSCHALK
Acting Commissioner of Patents